United States Patent
Kiyosada

(10) Patent No.: US 10,286,598 B2
(45) Date of Patent: May 14, 2019

(54) METHOD FOR MANUFACTURING THREE-DIMENSIONAL MOLDED PRODUCT AND THREE-DIMENSIONAL MOLDED PRODUCT USING THE SAME

(71) Applicants: KJ CHEMICALS CORPORATION, Tokyo (JP); MIMAKI ENGINEERING CO., LTD., Nagano (JP)

(72) Inventor: Toshitsugu Kiyosada, Kumamoto (JP)

(73) Assignees: KJ CHEMICALS CORPORATION, Tokyo (JP); MIMAKI ENGINEERING CO., LTD., NAGANO (JP)

( * ) Notice: Subject to any disclaimer, the term of this patent is extended or adjusted under 35 U.S.C. 154(b) by 101 days.

(21) Appl. No.: 15/533,546

(22) PCT Filed: Feb. 3, 2016

(86) PCT No.: PCT/JP2016/053151
§ 371 (c)(1),
(2) Date: Jun. 6, 2017

(87) PCT Pub. No.: WO2016/125816
PCT Pub. Date: Aug. 11, 2016

(65) Prior Publication Data
US 2018/0264716 A1    Sep. 20, 2018

(30) Foreign Application Priority Data
Feb. 6, 2015 (JP) ................... 2015-022107

(51) Int. Cl.
| | |
|---|---|
| *B29C 64/112* | (2017.01) |
| *B29C 67/00* | (2017.01) |
| *B33Y 80/00* | (2015.01) |
| *B33Y 70/00* | (2015.01) |
| *B33Y 10/00* | (2015.01) |
| *B29C 64/40* | (2017.01) |
| *B29C 33/44* | (2006.01) |
| *C09D 11/101* | (2014.01) |
| *C09D 11/102* | (2014.01) |
| *C09D 11/38* | (2014.01) |

(52) U.S. Cl.
CPC ............ *B29C 64/112* (2017.08); *B29C 33/44* (2013.01); *B29C 64/40* (2017.08); *B29C 67/00* (2013.01); *B33Y 10/00* (2014.12); *B33Y 70/00* (2014.12); *B33Y 80/00* (2014.12); *C09D 11/101* (2013.01); *C09D 11/102* (2013.01); *C09D 11/38* (2013.01)

(58) Field of Classification Search
None
See application file for complete search history.

(56) References Cited

U.S. PATENT DOCUMENTS

| 5,503,785 A | 4/1996 | Crump et al. |
|---|---|---|
| 2011/0180952 A1 | 7/2011 | Napadensky |
| 2013/0234370 A1 | 9/2013 | Suzuki et al. |
| 2018/0291219 A1* | 10/2018 | Kiyosada .............. C08F 220/58 |

FOREIGN PATENT DOCUMENTS

| JP | 2004-255839 | 9/2004 |
|---|---|---|
| JP | 2005-35299 | 2/2005 |
| JP | 2008-507619 | 3/2008 |
| JP | 2009-170624 | 7/2009 |
| JP | 2010-155889 | 7/2010 |
| JP | 2011-5658 | 1/2011 |
| JP | 2012-96428 | 5/2012 |
| JP | 2012-111226 | 6/2012 |
| JP | 2014-83744 | 5/2014 |
| JP | 2015-038166 | 2/2015 |
| WO | 01/68375 | 9/2001 |

OTHER PUBLICATIONS

International Search Report issued in WIPO Patent Application No. PCT/JP2016/053151, dated Apr. 19, 2016.
Extended European Search Report dated Feb. 21, 2018 in European Application No. 16746647.3.
First Office Action issued in Chinese Patent Application No. 201680004592.1 dated Aug. 20, 2018.

* cited by examiner

*Primary Examiner* — Monica A Huson
*Assistant Examiner* — Kelsey C Grace
(74) *Attorney, Agent, or Firm* — Greenblum & Bernstein, P.L.C.

(57) ABSTRACT

A method for manufacturing a three-dimensional molded product capable of performing support at high accuracy using a support material having sufficient hardness and rigidity, capable of removing the support material efficiently after molding, and requiring no finishing step in manufacturing a three-dimensional molded product by an inkjet optical molding method, and a three-dimensional molded product manufactured by this method. A roughly molded product formed from a model material forming a molded product and a support material supporting the shape of the model material during molding is immersed in a washing liquid. The support material swells at a swelling ratio of 10% or more, and is thereby peeled from an interface with the model material having a swelling ratio of 1% or less. Then, the support material is easily and completely removed without applying an external force. Furthermore, a three-dimensional molded product can be manufactured with high accuracy and high efficiency.

5 Claims, No Drawings

METHOD FOR MANUFACTURING THREE-DIMENSIONAL MOLDED PRODUCT AND THREE-DIMENSIONAL MOLDED PRODUCT USING THE SAME

TECHNICAL FIELD

The present invention relates to a method for manufacturing a three-dimensional molded product by an inkjet type three-dimensional molding method, a photocurable ink used for an inkjet optical molding method, and a three-dimensional molded product obtained thereby.

BACKGROUND ART

An addition manufacturing technique is a technique for obtaining a desired three-dimensional molded product in the following manner. According to this technique, a thermoplastic resin, a photocurable resin, a powdered resin, a powdered metal, or the like is fused and cured based on three-dimensional shape data by melt extrusion, inkjet, laser light, an electron beam, or the like, and is laminated in a thin film form. A molded product is obtained directly from the shape data, and a complicated shape such as a hollow shape or a meshed shape can be integrally molded. Therefore, a field of application has been expanded to medical and aircraft industries, an industrial robot, and the like in addition to creation of a small lot or custom made test model.

In order to obtain a three-dimensional molded product, a three-dimensional molding apparatus generally called a 3D printer is used. Specifically, an inkjet ultraviolet curing type 3D printer using an acrylic photocurable ink, a heat melting lamination type 3D printer using an acrylonitrile-butadiene-styrene resin, a polycarbonate resin, a polyphenylsulfone resin, a polyetherimide resin, or the like, a powder molding type 3D printer, an optical molding type 3D printer, and the like are known. Examples of the inkjet ultraviolet curing type 3D printer include Objet manufactured by Stratasys Ltd. and AGLISTA manufactured by Keyence Corporation. Examples of the melting lamination type 3D printer include FORTUS, Dimension, and uPrint manufactured by Stratasys Ltd. Examples of the powder molding type 3D printer include SLS manufactured by 3D Systems, Inc. Examples of the optical molding type 3D printer include SLA manufactured by 3D Systems, Inc. and DigitalWax manufactured by DWS Corporation.

According to three-dimensional molding, a three-dimensional molded product having a complicated shape can be formed. However, in order to manufacture a hollow structure or the like, it is necessary to dispose a shape supporting structure for temporarily supporting a resin during molding at a bottom of a three-dimensional molded product in order to prevent the three-dimensional molded product from being deformed by its own weight. In a case of the powder molding type 3D printer in which a powder raw material is bonded or fused, an unbonded or unfused powder acts as a support and supports a structure. Therefore, a three-dimensional molded product can be obtained by scraping off an excess powder after manufacturing. Even in the optical molding type 3D printer in which a photosensitive resin is gradually cured by laser light or the like, an uncured photosensitive resin supports a structure. Therefore, a support can be removed only by pulling up a three-dimensional molded product from a photosensitive resin tank. On the other hand, when widely used melt extrusion type or inkjet type three-dimensional molding is performed, a three-dimensional molded product made of a model material and a support made of a support material are formed simultaneously. Therefore, it is necessary to provide a step of removing the support material after formation.

However, removing a support material after molding is not easy work at all. The support material is fused, adheres, or sticks to an intended three-dimensional molded product. Therefore, in work of peeling the support material from the molded product, a means such as peeling the support material manually using a spatula, a brush, or the like, or blowing off the support material with a water jet is usually used. However, there is a risk of breakage of the three-dimensional molded product. Therefore, necessity of careful work has been a large burden.

Therefore, as the support material, a thermoplastic resin, a hot melt wax, a material which can be dissolved in water or an organic solvent, a water-swellable gel, or the like is used. A separation method utilizing heating, dissolution, a chemical reaction, power washing such as hydraulic washing, electromagnetic wave irradiation, a thermal expansion difference, or the like according to a property of a support material has been proposed (Patent Literatures 1 and 2). Specifically, use of a resin which can be easily peeled from a model material (Patent Literatures 3 and 4), melt-removing a support material by heat using a wax as the support material (Patent Literature 5), a means for dissolving or dispersing a support material in an alkali, water, or an organic solvent (Patent Literatures 6 to 11), and a means for removing a support material using an electrolyte solution such as tetramethylammonium hydroxide as a washing liquid under stirring or energizing (Patent Literature 12) have been proposed.

However, also in these support materials, it is extremely difficult to efficiently remove a portion with which details are clogged. In addition, when a method for melt-removing a wax or the like by heat is used, an oily residue adheres to a surface of a three-dimensional molded product after removal. Therefore, finishing work for the three-dimensional molded product such as wiping is required. Furthermore, a wax penetrates into the model material by heating. As a result, a surface state of the three-dimensional molded product is deteriorated disadvantageously.

Also, even when a supporting material is dissolved or dispersed in an alkali, water, or an organic solvent, the dissolved or dispersed support material is not separated from a washing liquid. Therefore, the support material easily adheres to a three-dimensional molded product immersed in a washing tank. As a result, surface contamination of the three-dimensional molded product is brought about. As a result, finishing work for the three-dimensional molded product, such as surface wiping is required.

On the other hand, in a method for removing a resin from a substrate by swelling in a washing liquid such as an organic solvent, a peeled resin and the solvent are separated into two phases. Therefore, a surface of the substrate is hardly contaminated, and peeling from a fine structure is easy. Therefore, this method is well known as a means used for removal of a photoresist in semiconductor manufacturing (Patent Literature 11). However, it is usually necessary to apply an external force such as ultrasonic vibration or flow of a washing liquid after swelling for peeling a photoresist material. Therefore, it is a disadvantage that an increase in cost and reduction in a production efficiency are caused by installing a special and large-sized washing apparatus, adding a peeling step, and the like Therefore, development of a support material requiring no manual removal, finishing step, or special large-sized washing apparatus, and development of an efficient method for manufacturing a three-dimensional molded product using the same have been desired.

CITATION LIST

Patent Literature

PATENT LITERATURE 1: JP 2005-035299 A
PATENT LITERATURE 2: JP 2012-096428 A
PATENT LITERATURE 3: U.S. Pat. No. 5,503,785
PATENT LITERATURE 4: WO 2001-068375
PATENT LITERATURE 5: JP 2004-255839 A
PATENT LITERATURE 6: JP 2008-507619 W
PATENT LITERATURE 7: JP 2011-005658 W
PATENT LITERATURE 8: JP 2010-155889 A
PATENT LITERATURE 9: JP 2012-111226 A
PATENT LITERATURE 10: JP 2014-083744 A
PATENT LITERATURE 11: JP 2009-170624 A

SUMMARY OF THE INVENTION

Problems to be Solved by the Invention

An object of the present invention is to provide a method for manufacturing a three-dimensional molded product capable of performing support at high accuracy using a support material having sufficient hardness and rigidity, capable of removing the support material efficiently after molding, and requiring no finishing step in manufacturing a three-dimensional molded product by an inkjet optical molding method, a photocurable ink for a support material used in this method, and a three-dimensional molded product manufactured by this method.

Solution to the Problems

The present inventors made intensive studies to solve the above problems. As a result, in inkjet type three-dimensional molding, when a roughly molded product formed from a model material (A) forming a molded product and a support material (B) supporting the shape of the model material (A) during molding is immersed in a washing liquid (C), the support material (B) swells and is peeled from an interface with the model material (A), and the support material (B) can be easily and completely removed in this way. Therefore, it has been found that the above object can be achieved. As a result, the present invention has been completed.

The present invention provides:
(1) a method for manufacturing a three-dimensional molded product, comprising obtaining a three-dimensional molded product in inkjet type three-dimensional molding by immersing a roughly molded product formed from a model material (A) forming a molded product and a support material (B) supporting the shape of the model material (A) during molding in a washing liquid (C), and peeling the support material (B) which has swelled from an interface with the model material (A);
(2) the method for manufacturing a three-dimensional molded product described in (1), wherein the support material (B) swells at a swelling ratio of 10% or more when the roughly molded product is immersed in the washing liquid (C);
(3) the method for manufacturing a three-dimensional molded product described in (1) or (2), wherein the swelling ratio of the support material (B) is 10% or more, and the swelling ratio of the model material (A) is 1% or less when the roughly molded product is immersed in the washing liquid (C);
(4) the method for manufacturing a three-dimensional molded product described in any one of (1) to (3), wherein the swelling ratio of the support material (B) is 20% or more, and the swelling ratio of the model material (A) is 1% or less when the roughly molded product is immersed in the washing liquid (C);
(5) the method for manufacturing a three-dimensional molded product described in any one of (1) to (4), wherein the washing liquid (C) is water;
(6) the method for manufacturing a three-dimensional molded product described in any one of (1) to (5), wherein a photocurable ink (D) used for the model material (A) and a photocurable ink (E) used for the support material (B) are discharged as ink droplets, are laminated, and then are cured by irradiation with an active energy ray to form a three-dimensional molded product;
(7) a photocurable ink which is a photocurable ink (E) used for a support material (B) in inkjet type three-dimensional molding, comprising:
  0.5 to 5.0% by mass of a urethane acrylamide (b1) having a polyethylene glycol skeleton;
  2.0 to 50.0% by mass of N-(2-hydroxyethyl) acrylamide (b2);
  2.0 to 30.0% by mass of a cationic monomer (b3) represented by general formula (1);
  40.0 to 70.0% by mass of a compound (b4) having an alkylene glycol structure;
  and
  0.1 to 5.0% by mass of a photopolymerization initiator (b5).

[Chemical formula 1]

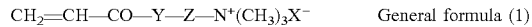

$$CH_2=CH-CO-Y-Z-N^+(CH_3)_3X^-  \quad \text{General formula (1)}$$

(In the formula, Y represents an oxygen atom or NH. Z represents an ethylene group or a propylene group. X— represents methylsulfonate or p-toluenesulfonate.);
(8) a support material obtained by curing the photocurable ink (E) described in (7) by irradiation with an active energy ray in inkjet type three-dimensional molding; and
(9) a three-dimensional molded product manufactured by the method for manufacturing a three-dimensional molded product described in any one of (1) to (6).

Effects of the Invention

According to the present invention, when a roughly molded product formed from the model material (A) and the support material (B) is immersed in the washing liquid (C), the support material swells, and an internal stress due to a difference in expansion and shrinkage occurs between the model material and the support material. Therefore, the support material can be peeled from the interface with the model material. In addition, by adjusting a swelling ratio of the support material in the washing liquid to 10% or more, it is possible to easily and completely peel the support material without applying an external force. Therefore, it is possible to manufacture a highly accurate three-dimensional molded product including a fine structure. Furthermore, the support material and the washing liquid are separated into two phases, and therefore a surface of the molded product is not contaminated. As a result, a step of washing fat and oil and the like and a finishing step of wiping fat and oil and the like are unnecessary. Therefore, there is an effect leading to improvement of workability and productivity. In addition, it is easy to separate and collect the support material from the washing liquid by decantation or filtration. Therefore, an effect of reducing an environmental load can be also expected.

DESCRIPTION OF THE EMBODIMENTS

Hereinafter, the present invention will be described in detail.

The model material (A) in the present invention is a general resin which can be used in inkjet type three-dimensional molding. The model material (A) is preferably characterized in that the content of a polymer component dissolved when the model material (A) is immersed in a washing liquid is 1% or less and a swelling ratio thereof is 1% or less. When the content of a component of the model material (A) dissolved when the model material (A) is immersed in a washing liquid is 1% or less, a surface state of a three-dimensional molded product formed from the model material is not deteriorated. Therefore, the content of a component of the model material (A) dissolved is preferably 1% or less. In addition, when the swelling ratio of the model material (A) is 1% or less, swelling peeling of a support material can proceed more smoothly. As a result, there is little swelling deformation of a three-dimensional molded product obtained. Therefore, the swelling ratio is preferably 1% or less. Furthermore, the swelling ratio of the model material (A) is more preferably 0.5% or less.

The support material (B) in the present invention is characterized in having a swelling ratio of 10% or more when the support material (B) is immersed in a washing liquid. When the swellability of the support material is 10% or more, a large internal stress is generated due to a difference in expansion and shrinkage between the model material and the support material. Therefore, it is possible to peel and remove the support material from the model material without applying an external force. In addition, the peeled support material can be collected favorably and easily by decantation or filtration. Furthermore, the swelling ratio is particularly preferably 20% or more from a viewpoint of more rapid peeling and removal.

Examples of the washing liquid (C) in the present invention include a general organic solvent and water. One of these washing liquids can be used singly, or two or more thereof can be used in combination. Examples of the general organic solvent include an aromatic hydrocarbon, an aliphatic hydrocarbon, an alcohol, a ketone, an alkylene glycol, a polyalkylene glycol, a glycol ether, a glycol ester, and a carboxylate. The washing liquid (C) is preferably water, isopropanol, or ethanol from a viewpoint of not dissolving the model material (A), easily separating a support material peeled from a three-dimensional molded product from a washing liquid, and safety. Furthermore, water having lower dissolubility and higher safety is particularly preferable.

Various additives can be used for the washing liquid (C) in the present invention, as necessary. Examples of the additives include a nonionic surfactant, a cationic surfactant, an anionic surfactant, an inorganic acid, an organic acid, an alkali metal hydroxide, an amine compound, an inorganic acid salt, and an organic acid salt. The addition amount of these additives is not particularly limited as long as not adversely affecting characteristics exhibited by the model material (A) and the support material (B) in the present invention. The addition amount is preferably 20% by mass or less with respect to the washing liquid (C).

The method for manufacturing a three-dimensional molded product according to the present invention is preferably an inkjet molding method using a photocurable ink. According to this method, the photocurable ink (D) used for the model material (A) and the photocurable ink (E) used for the support material (B) are discharged as ink droplets, and are laminated. Furthermore, the laminated product is cured by irradiation with an active energy ray, and a three-dimensional molded product is thereby formed.

The photocurable ink (D) is not particularly limited as long as being a general photocurable ink which can be used for an inkjet molding method. Examples of the photocurable ink (D) include VeroWhitePlus, VeroBlackPlus, VeroBlue, VeroGray, VeroClear, and the like manufactured by Stratasys Ltd., AR-M1 and AR-M2 manufactured by Keyence Corporation, and LH100Clear liquid, LH100Cyan, LH100Yellow, LH100Magenta, LH100White, LH100Black, LF-140Cyan, LF-140Light Cyan, LF-140Yellow, LF-140Magenta, LF-140Light Magenta, LF-140White, LF-140Black, and LF-140white manufactured by Mimaki Engineering Co., Ltd. One of these photocurable inks can be used singly, or two or more thereof can be used simultaneously for inkjet molding.

The support material (B) in the present invention is preferably a cured product of the photocurable ink (E) containing 0.5 to 5.0% by mass of the urethane acrylamide (b1) having a polyethylene glycol skeleton, 2.0 to 50.0% by mass of the N-(2-hydroxyethyl) acrylamide (b2), 2.0 to 30.0% by mass of the cationic monomer (b3), 40.0 to 70.0% by mass of the compound (b4) having an alkylene glycol structure, and 0.1 to 5.0% by mass of the photopolymerization initiator (b5).

The urethane acrylamide (b1) is a compound having a polyethylene glycol skeleton. This compound is obtained by an addition reaction among a polyol such as ethylene glycol or polyethylene glycol, a polyisocyanate compound having two or more isocyanate groups in one molecule thereof, and N-(2-hydroxyethyl) acrylamide. Specific examples thereof include urethane acrylamide, urethane diacrylamide, and urethane triacrylamide having a polyethylene glycol skeleton.

The content of the urethane acrylamide (b1) in the present invention is from 0.5 to 5.0% by mass with respect to the entire photocurable ink (E). When the content is 0.5% by mass or more, the support material (B) obtained by polymerizing the photocurable ink (E) by irradiation with an active energy ray has excellent tensile strength, hardness, elasticity, and the like. Furthermore, bleeding out of the compound (b4) having an alkylene glycol structure can be suppressed. Therefore, the content is preferably 0.5% by mass or more. When the content is 5.0% by mass or less, the photocurable ink (E) has a low viscosity, and therefore operability such as a discharge property of inkjet is excellent. Furthermore, the swelling ratio in the washing liquid (C) is large. Therefore, the content is preferably 5.0% by mass or less.

Examples of the polyisocyanate compound having two or more isocyanate groups in one molecule thereof include an aliphatic isocyanate having an isocyanate group introduced into an alkyl group having a linear or branched chain of 3 to 18 carbon atoms, such as hexamethylene diisocyanate, an alicyclic isocyanate having an isocyanate group introduced into an alkyl group having a cyclic structure of 6 to 18 carbon atoms, such as isophorone diisocyanate, an aromatic isocyanate having an isocyanate group introduced into an aromatic group of 6 to 12 carbon atoms, such as tolylene diisocyanate, and adduct type, isocyanurate type, and buret type multimers thereof. One compound of these polyisocyanates can be used singly, or two or more compounds thereof can be used in combination.

The content of the N-(2-hydroxyethyl) acrylamide (b2) in the present invention is preferably from 2.0 to 50.0% by mass with respect to the entire photocurable ink (E). When the content is 2.0% by mass or more, bleeding out of the compound (b4) from the cured support material (B) can be suppressed. In addition, the swelling ratio is large. Therefore, the content is preferably 2.0% by mass or more. In addition, when the content is 50.0% by mass or less, the curing shrinkage ratio of the obtained support material (B) can be suppressed to a low value. In addition, heat generation during curing can be controlled. Therefore, foaming due to abrupt heating of the compound (b4) does not occur. As a result, a three-dimensional molded product can be manufactured with high accuracy. Therefore, the content is preferably 50.0% by mass or less.

The cationic monomer (b3) used in the present invention is a compound represented by general formula (1) (In the formula, Y represents an oxygen atom or NH. Z represents an ethylene group or a propylene group. X— represents methylsulfonate or p-toluenesulfonate.).

[Chemical formula 2]

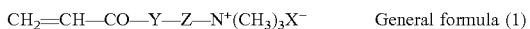

$$CH_2{=}CH{-}CO{-}Y{-}Z{-}N^+(CH_3)_3X^- \quad \text{General formula (1)}$$

The content of the cationic monomer (b3) in the present invention is preferably from 2.0 to 30.0% by mass with respect to the entire photocurable ink (E). The content of 2.0% by mass or more is preferable because the cured support material (B) has excellent swellability in water. Furthermore, the content of 30.0% by mass or less is preferable because the obtained support material (B) and water are easily separated into two phases.

Specific examples of a cation of the cationic unsaturated monomer (b3) represented by the above general formula (1) used in the present invention include (2-ethyl acrylate) trimethylammonium, (3-propyl acrylate) trimethylammonium, (2-propyl acrylate) trimethylammonium, (2-acrylamidoethyl) trimethylammonium, (3-acrylamidopropyl) trimethylammonium, and (2-acrylamidopropyl) trimethylammonium. Specific examples of an anion include methylsulfonate and p-toluenesulfonate.

The cationic monomer (b3) used in the present invention is an onium salt formed by combining a cation and an anion. The cation is one or more ions selected arbitrarily from the above cations. The anion is one or more ions selected arbitrarily from the above anions.

Examples of the compound (b4) having an alkylene glycol structure used in the present invention include an alkylene glycol and a polyalkylene glycol. One of these compounds can be used singly, or two or more thereof can be used in combination.

The compound (b4) is preferably a compound represented by the following general formula (2) (In the formula, $R_1$ represents a hydrogen atom or an alkyl group having 1 to 4 carbon atoms. $R_2$ represents a hydrogen atom or a methyl group. $R_3$ represents a hydrogen atom, an alkyl group having 1 to 4 carbon atoms, or an acetyl group. n represents an integer of 1 to 100.). This compound has high compatibility with the N-(2-hydroxyethyl) acrylamide (b2) and the cationic monomer (b3). In addition, the photocurable ink (E) can be easily prepared using this compound. Furthermore, an ethylene glycol having a hydroxyethyl group similar to the above N-(2-hydroxyethyl) acrylamide is more preferable because of having excellent compatibility and causing no bleeding out.

[Chemical formula 3]

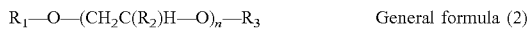

$$R_1{-}O{-}(CH_2C(R_2)H{-}O)_n{-}R_3 \quad \text{General formula (2)}$$

The content of the compound (b4) used in the present invention is from 40.0 to 70.0% by mass with respect to the entire photocurable ink (E). When the content is 40.0% by mass or more, the photocurable ink (E) has a low viscosity, and therefore operability such as a discharge property of inkjet is excellent. In addition, a three-dimensional molded product can be manufactured with high accuracy because a support material obtained by curing has a low curing shrinkage ratio. Therefore, the content is preferably 40.0% by mass or more. When the content is 70% by mass or less, tensile strength, hardness, elasticity, and the like of a cured product obtained by polymerization using an active energy ray are sufficiently satisfied, the compound (b4) does not bleed out, and a large swelling ratio can be maintained. Therefore, the content is preferably 70% by mass or less.

The photopolymerization initiator (b5) used in the present invention can be selected appropriately from usual photopolymerization initiators, examples of which include an acetophenone type such as 1-hydroxycyclohexyl phenyl ketone, a benzoin type such as benzoin isopropyl ether, a benzophenone type such as benzophenone, an α-amino ketone type such as 2-methyl-1-[4-(methylthio)phenyl]-2-(4-morpholinyl)-1-propanone, a xanthone type such as xanthone, an anthraquinone type such as 2-ethylanthraquinone, an acylphosphine oxide type such as 2,4,6-trimethylbenzoyl-diphenyl-phosphine oxide, and a polymer photoinitiator type such as a polymer of {2-hydroxy-2-methyl-1-[4-(1-methylvinyl) phenyl]propan-1-one}. One photopolymerization initiator of these photopolymerization initiators can be used. Alternatively, two or more photopolymerization initiators thereof can be used in combination.

The content of the photopolymerization initiator (b5) used in the present invention is preferably from 0.1 to 5.0% by mass with respect to the entire photocurable ink (E). When the content is 0.1% by mass or more, a sufficient polymerization reaction of the photocurable ink (E) occurs by irradiation with an active energy ray. Therefore, the amount of a residual monomer in the resulting support material (B) is small, the tensile strength, hardness, elasticity, and the like of a cured product are excellent, and bleeding out of the compound (b4) can be suppressed. Therefore, the content is preferably 0.1% by mass or more. When the content is 5% by mass or less, a pot life of the photocurable ink (E) is long, and therefore a trouble such as gelling during storage does not occur. Therefore, the content is preferably 5% by mass or less.

The photocurable ink (E) of the present invention is cured by irradiation with an active energy ray. The active energy ray in the present invention is an electromagnetic wave or a charged particle beam having an energy quantum. That is, the active energy ray means a light energy ray such as visible light, an electron beam, an ultraviolet ray, an infrared ray, an X-ray, an α-ray, a β-ray, or a γ-ray, for example. Examples of an active energy ray source include a ray source such as a high-pressure mercury lamp, a halogen lamp, a xenon lamp, a metal halide lamp, an ultraviolet LED lamp, an electron beam accelerator, or a radioactive element. An active energy ray for irradiation is preferably an ultraviolet ray from a viewpoint of storage stability, the low curing rate, and the low toxicity of the photocurable ink (E).

A required amount of active energy ray irradiation (accumulated light amount) is not particularly limited. The required amount varies according to the type and addition amount of each of the urethane acrylamide (b1), the N-(2-hydroxyethyl) acrylamide (b2), and the cationic monomer (b3) used in the photocurable ink (E). The accumulated light amount is preferably 50 mJ/cm$^2$ or more and 1000 mJ/cm$^2$ or less. When the accumulated light amount is 50 mJ/cm$^2$ or more, curing proceeds sufficiently, and a cured product has excellent tensile strength, hardness, elasticity, and the like. In addition, bleeding out of the compound (b4) is suppressed. Therefore, the accumulated light amount is preferably 50 mJ/cm$^2$ or more and 1000 mJ/cm$^2$ or less. When the accumulated light amount is 1000 mJ/cm$^2$ or less, irradiation time of an active energy ray is short, leading to improvement of productivity in the three-dimensional molding method. Therefore, the accumulated light amount is preferably 1000 mJ/cm$^2$ or less.

In the active energy ray-curable resin composition of the present invention, an ethylenically unsaturated compound (F) can be further used in addition to the ionic monomer (A), the nonionic water-soluble monomer (B), and the polyfunctional unsaturated monomer (E). The ethylenically unsaturated compound (F) is a monofunctional (meth)acrylate or vinyl compound. One compound may be used singly. Alternatively, two or more compounds may be used in combination. The addition amount of the ethylenically unsaturated compound (F) is not particularly limited as long as not adversely affecting a characteristic exhibited by the active energy ray-curable resin composition according to the present invention. The addition amount is preferably in a range of 10% by mass or less with respect to the entire active energy ray-curable resin composition.

Examples of the above monofunctional (meth)acrylate include alkyl (meth)acrylate having a linear, branched, or cyclic alkyl group with 1 to 22 carbon atoms introduced, hydroxyalkyl (meth)acrylate having a linear, branched, or cyclic hydroxyalkyl group with 2 to 8 carbon atoms introduced, alkylene glycol mono (meth)acrylate and polyalkylene glycol mono (meth)acrylate having an alkylene glycol chain with 2 to 6 carbon atoms introduced, alkoxy alkyleneglycol mono (meth)acrylate and alkoxy polyalkyleneglycol mono (meth)acrylate having an alkoxy group with 1 to 18 carbon atoms and an alkylene glycol chain with 2 to 6 carbon atoms introduced, phenoxyalkyleneglycol (meth)acrylate and phenoxypolyalkyleneglycol (meth)acrylate having an introduced functional group having a phenoxy group and an alkylene glycol group with 2 to 6 carbon atoms, and aminoalkyl (meth)acrylate, N-alkylaminoalkyl (meth)acrylate, N,N-dialkylaminoalkyl (meth)acrylate, benzyl (meth)acrylate, dicyclopentanyl (meth)acrylate, dicyclopentanyloxyethyl (meth)acrylate, dicyclopentenyl (meth) acrylate, dicyclopentenyloxyethyl (meth)acrylate, bornyl (meth)acrylate, isobornyl (meth)acrylate, 2-methyl-2-adamantyl (meth)acrylate, allyl (meth)acrylate, and glycidyl (meth)acrylate having a linear, branched, or cyclic alkyl group with 2 to 8 carbon atoms introduced.

Examples of the monofunctional (meth)acrylamide include N-alkyl (meth)acrylamide and N,N-dialkyl (meth) acrylamide having an alkyl group with 1 to 18 carbon atoms introduced, N-(hydroxyalkyl) (meth)acrylamide, N,N-di (hydroxyalkyl) (meth)acrylamide, and N-hydroxyalkyl-N-(4-hydroxyphenyl) (meth)acrylamide having a hydroxyalkyl group with 1 and 3 to 6 carbon atoms introduced, N-alkyl-N-hydroxyalkyl (meth)acrylamide having a hydroxyalkyl group with 1 to 6 carbon atoms and an alkyl group with 1 to 6 carbon atoms introduced, N-alkoxyalkyl (meth)acrylamide and N,N-di(alkoxyalkyl) (meth)acrylamide having an alkoxyalkyl group formed of an alkoxy group with 1 to 6 carbon atoms and an alkylene group with 1 to 6 carbon atoms introduced, and N-alkyl-N-alkoxyalkyl (meth)acrylamide, N-[3-(dialkylamino)]alkyl (meth)acrylamide, N-hydroxyphenyl (meth)acrylamide, and N-(meth)acryloyl morpholine having an alkoxyalkyl group formed of an alkoxy group with 1 to 6 carbon atoms and an alkylene group with 1 to 6 carbon atoms, and an alkyl group with 1 to 6 carbon atoms introduced.

Examples of the vinyl compound include vinyl acetate, methyl vinyl ether, ethyl vinyl ether, styrene, N-vinyl pyrrolidone, and N-vinyl caprolactam.

Various additives can be used in the photocurable ink (E) of the present invention, as necessary. Examples of the additive include a thermal polymerization inhibitor, an anti-aging agent, an antioxidant, an ultraviolet sensitizer, a preservative, a phosphate type and another flame retardant, a surfactant, a wet dispersing material, an antistatic agent, a coloring agent, a plasticizer, a surface lubricant, a leveling agent, a softening agent, an organic filler, and an inorganic filler. The addition amount of these resins and additives is not particularly limited as long as not adversely affecting the characteristics exhibited by the photocurable ink (E) according to the present invention. The addition amount is preferably 5% by mass or less with respect to the entire photocurable ink (E).

Examples of the thermal polymerization inhibitor include hydroquinone, p-methoxyphenol, 2,6-di-tert-butyl-p-cresol, pyrogallol, and β-naphthol.

Examples of the anti-aging agent include hindered phenol type compounds such as butylated hydroxy toluene and butyl hydroxy anisole, benzotriazole type compounds, and hindered amine type compounds.

Examples of the surfactant include an alkylene oxide addition type nonionic surfactant such as a polyethylene oxide adduct of nonylphenol, a polyethylene oxide adduct of lauric acid, or a polyethylene oxide adduct of stearic acid; a polyhydric alcohol type nonionic surfactant such as sorbitan palmitic acid monoester, sorbitan stearic acid monoester, or sorbitan stearic acid triester; a fluorine-containing surfactant such as a perfluoroalkyl polyethylene oxide adduct, perfluoroalkyl carboxylate, or perfluoroalkyl betaine; a modified silicone oil such as polyether-modified silicone oil or (meth) acrylate-modified silicone oil; and an amphoteric polymer surfactant (manufactured by BYK Japan KK, BYKJET-915, BYKJET-9151, and the like).

The method for manufacturing a three-dimensional molded product according to the present invention is preferably a manufacturing method based on the following type optical molding method. In this method, first, fine droplets of a photocurable ink are discharged from an ink discharge nozzle by an inkjet method so as to draw a predetermined shape pattern. Then, a cured thin film is formed by irradiating the discharged photocurable ink with an ultraviolet ray. Specifically, first, the following data is formed as three-dimensional molding data based on three-dimensional CAD data of an object to be molded. That is, cross-sectional shape data obtained by slicing a cured thin film corresponding to a three-dimensional molded product to be molded in a lamination direction thereof is created. Furthermore, data obtained by slicing a cured thin film of the support material (B) for supporting the model material (A) during molding in a lamination direction thereof is created. For example, when the model material (A) at an upper position has a so-called overhanging portion, installation data of a support material is created such that the support material (B) is provided such that this overhanging portion is supported from a lower side due to the support material (B) disposed around the model material (A) at a lower position. A photocurable ink as a raw material of the model material (A) or the support material (B) is discharged from an inkjet nozzle in a desired pattern according to cross-sectional shape data of the model material (A) and the support material (B), and a thin film layer of the resin is thereby formed. Thereafter, the thin film layer of the resin is cured by irradiation with curing light from a light source. Subsequently, the photocurable ink (D) as a raw material of the model material (A) or the photocurable ink (E) as a raw material of the support material (B) is supplied onto the cured thin film layer of the resin from the inkjet nozzle according to a subsequent cross-sectional shape. By repeating the above operation, the cured resin layer corresponding to each cross-sectional shape is laminated. As a result, an intended three-dimensional molded product and support are formed. The support is usually formed between a planar stage and the three-dimensional molded product. When the three-dimensional molded product is formed, the photocurable ink (D) is supplied from an inkjet nozzle. When the support is formed, the photocurable ink (E) is supplied from the inkjet nozzle. The photocurable ink (D) and the photocurable ink (E) may be discharged from the same inkjet nozzle or may be discharged from separate inkjet nozzles.

The photocurable ink (E) in the present invention is preferably discharged by an inkjet method and is cured by irradiation with an active energy ray. Therefore, the viscosity thereof is preferably from 2 mPa·s to 100 mPa·s at 25° C. from a viewpoint of stably discharging the photocurable ink (E). The discharge temperature is preferably in a range of 20 to 80° C. When the discharge temperature is set to a high temperature, the viscosity of the photocurable ink (E) is lowered. Therefore, a resin having a high viscosity can be discharged. However, denaturation and polymerization by heat easily occur. Discharging at a temperature lower than 60° C. is preferable. Therefore, the viscosity of the photocurable ink (E) is preferably 50 mPa·s or less.

According to a method for washing the support material (B) in the method for manufacturing a three-dimensional molded product according to the present invention, a three-dimensional molded product formed of the model material (A) supported by the support material (B) is immersed in the washing liquid (C). The support material (B) thereby swells due to the washing liquid (C). Then, the support material (B) is peeled from the model material (A) and is removed without applying an external force due to an internal stress generated due to a difference in a swelling ratio between the support material (B) and the model material (A). The removed support material (B) and the washing liquid (C) are separated into two phases. Therefore, it is easy to separate and collect the support material (B) from the washing liquid (C) by filtration. In addition, the washing liquid (C) attached to the three-dimensional molded product and the support material (B) are separated into two phases. Therefore, a surface of the model material (A) is not contaminated by the dissolved support material (B). Therefore, the washing liquid (C) can be removed by volatilization thereof.

The washing time of the support material (B) is preferably 24 hours or less, and more preferably 10 hours or less. When the washing time is 24 hours or less, a washing cycle can be repeated every day efficiently. Therefore, the washing time is preferably 24 hours or less from a viewpoint of production efficiency. When the washing time is 10 hours or less, a molded product manufactured in the daytime is washed at night, and washing can be completed the next day. Therefore, more efficient production is possible. Therefore, the washing time is more preferably 10 hours or less.

The shape of the support material (B) can be any shape as long as being provided so as to support the shape of the model material (A). The support material (B) in the present invention can be obtained as a support which can be removed without applying an external force by immersing the support material (B) in the washing liquid (C). It is also possible to provide a large number of supports in contact with any outer surface of a roughly molded product. In this way, by providing a large number of supports, deformation due to its own weight is prevented. In addition, there is also an effect of shielding light against a portion molding of which has been finished. Therefore, degradation of a roughly molded product due to excessive irradiation with an activation energy ray can be also prevented.

EXAMPLES

Hereinafter, the present invention will be described more specifically with reference to Examples and Comparative Examples. However, the present invention is not limited to these Examples. In the following, "parts" and "%" are all based on mass unless otherwise specified.

Manufacturing Example 1 Manufacturing Urethane Acrylamide (b1-1)

In a 300 mL separable flask equipped with a stirrer, a thermometer, and a reflux condenser, 44.07 g of polyethylene glycol having a terminal hydroxy group with a hydroxy value of 374 mg KOH/g and a number average molecular weight of 300 and 0.20 g of methylhydroquinone as a polymerization inhibitor were added. Thereto, 38.31 g of tolylene diisocyanate was added as a polyisocyanate. A reaction was performed at 60° C. for 3 hours while stirring was performed in a nitrogen atmosphere. To this reaction product, 17.40 g of N-(2-hydroxyethyl) acrylamide and 0.02 g of dibutyltin dilaurate as a catalyst were further added. A reaction was performed at 60° C. for 3 hours. Then, it was confirmed by IR measurement that an absorption peak of an isocyanate group at 2230 $cm^{-1}$ disappeared. Thereafter, the reactor was cooled to obtain urethane acrylamide (b1-1) having a weight average molecular weight of 4,800.

Manufacturing Urethane Acrylamide (b1-2)

In a 300 mL separable flask equipped with a stirrer, a thermometer, and a reflux condenser, 65.59 g of polyethylene glycol having a terminal hydroxy group with a hydroxy value of 187 mgKOH/g and a number average molecular weight of 600 and 0.20 g of methylhydroquinone as a polymerization inhibitor were added. Thereto, 29.10 g of isophorone diisocyanate was added as a polyisocyanate. A reaction was performed at 60° C. for 3 hours while stirring was performed in a nitrogen atmosphere. To this reaction product, 4.99 g of N-(2-hydroxyethyl) acrylamide and 0.02 g of dibutyltin dilaurate as a catalyst were further added. Then, a reaction was performed at 60° C. for 3 hours. Then, it was confirmed by IR measurement that an absorption peak of an isocyanate group at 2230 $cm^{-1}$ disappeared. Thereafter, the reactor was cooled to obtain urethane acrylamide (b1-2) having a weight average molecular weight of 12,600.

Note that the weight average molecular weights of the obtained urethane acrylamide (b1-1 and b1-2) were calculated by performing a measurement with a high performance liquid chromatography (LC-10A manufactured by Shimadzu Corporation was used. Shodex GPC KF-806L (exclusion limit molecular weight: 2×107, separation range: 100 to 2×107, theoretical plate number: 10,000 steps/column, filler material: styrene-divinylbenzene copolymer, filler particle diameter: 10 µm) was used as a column, and tetrahydrofuran was used as an eluent), and then converting the measurement result into a standard polystyrene molecular weight.

Manufacturing Example 1 Synthesis of Photocurable Ink (E-1) for Forming Support Material (B-1) for Examples Into a container, 0.5 parts by mass of urethane acrylamide (b1-1), 50.0 parts by mass of N-(2-hydroxyethyl) acrylamide (b2), 2.0 parts by mass of N,N,N-trimethylammonium propylacrylamide p-toluenesulfonate (b3-1), 45.0 parts by mass of ethylene glycol (b4-1), and 2.5 parts by mass of IRGACURE184 (1-hydroxycyclohexyl phenyl ketone (manufactured by BASF Japan Ltd.)) (b4-1)) were put. By stirring the resulting mixture at 25° C. for one hour, the uniform and transparent photocurable ink (E-1) was obtained.

Manufacturing Examples 2 to 5 Synthesis of Photocurable Inks (E-2) to (E-5) for Forming Support Materials (B-2) to (B-5)

Photocurable inks (E-2) to (E-5) were obtained by performing the same operation as in Manufacturing Example 1 with the compositions shown in Table 1.

Manufacturing Examples 6 to 8 Synthesis of Photocurable Inks (E-6) to (E-8) for Forming Support Materials (B-6) to (B-8) for Comparative Examples Photocurable inks (E-6) to (E-8) were obtained by performing the same operation as in Manufacturing Example 1 with the compositions shown in Table 1. Here, the photocurable ink (E-7) referred to Example 2-2 described in Patent Literature 9 (JP 2012-111226 A). The photocurable ink (E-8) referred to Example 9 described in Patent Literature 8 (JP 2010-155889 A).

b1-4: Diacrylate of polyethylene glycol (molecular weight 1000) (manufactured by Sartomer Company)
b2: N-(2-hydroxyethyl) acrylamide
b3: Cationic monomer
  b3-1: N,N,N-trimethylammonium propylacrylamide p-toluenesulfonate
  b3-2: N,N,N-trimethylammonium ethyl acrylate methanesulfonate
b4: Compound having an alkylene glycol structure
  b4-1: Ethylene glycol
  b4-2: Diethylene glycol ethyl ether
  b4-3: PEG200 which is polyethylene glycol having a number average molecular weight of 200 (manufactured by Toho Chemical Industry Co., Ltd.)
  b4-4: UniolD400 which is 1,2-polypropylene glycol having a number average molecular weight of 400 (manufactured by NOF CORPORATION)
  b4-5: 1,2-propylene glycol
b5: Photopolymerization initiator
  b5-1: 1-hydroxycyclohexyl phenyl ketone (IRGACURE184, manufactured by BASF Japan Ltd.)
  b5-2: 2,4,6-trimethylbenzoyl-diphenyl-phosphine oxide (IRGACURE-TPO, manufactured by BASF Japan Ltd.)
b6: Ethylenically unsaturated compound other than b1, b2, and b3
  b6-1: N-acryloyl morpholine
  b6-2: N,N-diethylacrylamide
  b6-3: 4-hydroxybutyl acrylate
b7: Other additive
  b7-1: Deionized water
  b7-2: Emanon 1112 (polyethylene oxide laurate (12E.O.) adduct, manufactured by Kao Corporation)
  b7-3: 2,4-diphenyl-4-methyl-pentene Evaluation using the photocurable inks (E-1) to (E-8) for forming the support material (B) obtained in Manufacturing Examples 1 to 8, "LH100white" manufactured by Mimaki Engineering Co., Ltd. as the photocurable ink (D-1) for forming a model material (A-1), and "LF-140white" manufactured by Mimaki Engineering Co., Ltd. as the photocur-

TABLE 1

| Manufacturing Example | E | b1 | b1 parts by mass | b2 parts by mass | b3 | b3 parts by mass | b4 | b4 parts by mass | b5 | b5 parts by mass | b6 | b6 parts by mass | b7 | b7 parts by mass |
|---|---|---|---|---|---|---|---|---|---|---|---|---|---|---|
| Manufacturing Example 1 | E-1 | b1-1 | 0.5 | 50 | b3-1 | 2 | b4-1 | 45 | b5-1 | 2.5 | — | — | — | — |
| Manufacturing Example 2 | E-2 | b1-2 | 5 | 15 | b3-1 | 10 | b4-2 | 40 | b5-1 | 5 | b6-1 | 25 | — | — |
| Manufacturing Example 3 | E-3 | b1-1 | 2 | 30 | b3-1 | 20 | b4-2 b4-3 | 25 15 | b5-2 | 0.1 | — | — | b7-1 | 7.9 |
| Manufacturing Example 4 | E-4 | b1-1 | 3 | 15 | b3-2 | 10 | b4-2 b4-3 | 60 10 | b5-2 | 1 | — | — | b7-2 | 1 |
| Manufacturing Example 5 | E-5 | b1-1 | 2 | 2 | b3-1 | 30 | b4-3 b4-4 | 40 20 | b5-1 | 1 | b6-2 | 5 | — | — |
| Manufacturing Example 6 | E-6 | b1-3 | 0.5 | 0 | b3-1 | 5 | b4-2 | 52 | b5-1 | 2.5 | b6-3 | 40 | — | — |
| Manufacturing Example 7 | E-7 | b1-4 | 12.9 | 36.9 | — | — | b4-5 | 50.4 | b5-1 | 5 | — | — | b7-3 | 0.5 |
| Manufacturing Example 8 | E-8 | — | — | 30 | — | — | b4-4 | 70 | b5-1 | 3 | — | — | — | — |

Description of abbreviations in Table 1
b1: Urethane acrylamide
b1-1: PEG300/TDI urethane acrylamide
b1-2: PEG600/IPDI urethane acrylamide
b1-3: Ethylene glycol diacrylate able ink (D-2) for forming a model material (A-2) was performed in the following manner. The results are shown in Tables 2 and 3.

Viscosity Measurement

A cone-plate type viscometer (apparatus name: RE550 type viscometer manufactured by Toki Sangyo Co., Ltd.)

was used. The viscosity of a photocurable ink obtained in each of Examples and Comparative Examples was measured according to JIS K5600-2-3 at 25° C.

Inkjet Discharge Stability

Discharge stability was evaluated using the photocurable inks prepared above. The evaluation was performed at a temperature of 45° C., the discharge amount of 21 pl, and a drive frequency of 15 KHz using an inkjet printer (UJF-3042HG manufactured by Mimaki Engineering Co., Ltd.). A state while continuous discharge was performed for 30 minutes was observed. Observation results were classified according to the following evaluation criteria. The results are shown in Table 2.

⦾: Continuous discharge is possible without any problem.

○: Non-discharge, discharge disturbance, or the like is slightly observed after discharge pause or the like. However, the state returns to a normal state during discharge, and is in a state having substantially no problem.

Δ: Non-discharge or discharge disturbance occurs during discharge or after discharge pause. The state does not return to a normal state during discharge, but is in a state to return to a normal state by maintenance (washing with a washing liquid).

x: Non-discharge or discharge disturbance occurs during discharge or after discharge pause. Discharge cannot be performed normally, and the discharge state does not return to a normal state even by maintenance.

Curability

A heavy release PET film having a thickness of 75 μm (manufactured by Toyobo Co., Ltd., polyester film E7001) was brought into close contact with a horizontally placed glass plate (such that a surface to be treated was on the front). The photocurable ink (E) obtained in each of Examples and Comparative Examples was applied onto the film with a bar coater so as to have a thickness of 50 μm. The applied photocurable ink (E) was irradiated with an ultraviolet ray in the air (apparatus: manufactured by Eye Graphics Co., Ltd., inverter type conveyor apparatus ECS-4011GX, metal halide lamp: M04-L41 manufactured by Eye Graphics Co., Ltd., ultraviolet illuminance: 300 mW/cm$^2$, accumulated light amount in one pass: 200 mJ/cm$^2$), and the number of passes until the photocurable ink (E) was cured was measured. Curing described here means a state in which a surface of a coating film is not sticky.

Bleeding Out Resistance

A heavy release PET film having a thickness of 75 μm (manufactured by Toyobo Co., Ltd., polyester film E7001) was brought into close contact with a horizontally placed glass plate. A spacer having a thickness of 1 mm and an inner size of 50 mm×20 mm was installed therein. The photocurable ink (E) was filled into the spacer. Thereafter, a light release PET film having a thickness of 50 um (manufactured by Toyobo Co., Ltd., polyester film E7002) was further superimposed thereon. The photocurable ink (E) was cured by irradiation with an ultraviolet ray (apparatus: manufactured by Eye Graphics Co., Ltd., inverter type conveyor apparatus ECS-4011GX, metal halide lamp: M04-L41 manufactured by Eye Graphics Co., Ltd., ultraviolet illuminance: 300 mW/cm$^2$, accumulated light amount in one pass: 200 mJ/cm$^2$). In addition, the number of passes for irradiation with an ultraviolet ray was equal to the number of passes obtained in the above curability evaluation. Thereafter, the release PET films on both sides were removed to prepare a cured product, and the cured product was used as a test piece. The test piece was allowed to stand in a constant temperature and humidity chamber set to 25° C. and 50% RH for 168 hours. The surface of the test piece before and after standing was visually evaluated.

⦾: Bleeding out is not observed both before and after standing

○: Although bleeding out is not observed before standing, bleeding out is slightly observed after standing Δ: Bleeding out is observed slightly before standing, and bleeding out is observed to some extent after standing x: Bleeding out is observed to some extent before standing, and bleeding out is observed intensely after standing Dissolubility The dissolution ratio of the model material (A) can be determined from the following calculation formula. The rectangular model material (A) of 50 mm×20 mm×1 mm was immersed in a washing liquid at 25° C. for 24 hours. Thereafter, insoluble matters filtered with a 25-mesh wire net were dried at 60° C. for 24 hours. By measuring the weight of the insoluble matters after drying, the dissolution ratio is calculated.

Dissolution ratio (%)=(weight of cured product before immersion−weight of cured product after drying)/weight of cured product before immersion×100

Note that deionized water or isopropanol was used as the washing liquid.

Swellability

A swelling ratio of the model material (A) or the support material (B) can be determined from the following calculation formula. The rectangular model material (A) or the rectangular support material (B) of 50 mm×20 mm×1 mm was immersed in a washing liquid at 25° C. for 24 hours. The swelling ratio is calculated from the lengths of a long side of the model material (A) or the support material (B) before and after immersion.

Swelling ratio (%)=(length of cured product after immersion−length of cured product before immersion)/length of cured product before immersion×100

Note that deionized water or isopropanol was used as the washing liquid.

Removability of Support Material

A spacer having a thickness of 1 mm and an inner size of 50 mm×40 mm was installed in a horizontally placed PMMA plate having a thickness of 1 mm. Into the spacer, 1 g of the photocurable ink (D-1) or (D-2) for forming the model material (A) and 1 g of each of the photocurable inks (E-1) to (E-8) for forming the support material (B) obtained in Examples and Comparative Examples were filled in left and right portions so as to be in contact with each other. Thereafter, the model material (A) and the support material (B) were obtained by irradiation with an ultraviolet ray (apparatus: manufactured by Eye Graphics Co., Ltd., inverter type conveyor apparatus ECS-4011GX, metal halide lamp: M04-L41 manufactured by Eye Graphics Co., Ltd., ultraviolet illuminance: 300 mW/cm$^2$, accumulated light amount in one pass: 200 mJ/cm$^2$). In addition, the number of passes for irradiation with an ultraviolet ray was equal to the number of passes obtained in the above curability evaluation. Thereafter, the model material (A) and the support material (B) obtained on the PMMA plate were immersed in the washing liquid. Time until the support material was naturally peeled from the model material (A) and the PMMA plate and a peeling state were checked. The results were evaluated by the following evaluation method. As the washing liquid, deionized water or isopropanol was used.

⊚: An entire support material is removed (A contact portion with a model material and a surface of a PMMA plate have no roughness, stickiness, or the like)

○: A support material is removed almost completely (a contact portion with a model material and a surface of a PMMA plate have slight roughness, stickiness, or the like, which can be washed with water flow)

Δ: A most part of a support material is removed (a contact portion with a model material and a surface of a PMMA plate have residual roughness, stickiness, or the like, which cannot be washed with water flow)

Δx: A part of a support material is removed (a contact portion with a model material and a surface of a PMMA plate have a large amount of a residue of the support material)

x: A support material is not removed

Collection of Support Material (B)

After removability of the above support material was checked, the washing liquid and the peeled support material were filtered with a 25-mesh wire net, and the support material was thereby collected. A collecting state was evaluated by the following evaluation method.

○: An entire support material is collected (a filtrate contains neither a dispersion of the support material nor small pieces of an insoluble portion thereof)

Δ: Most of a support material is collected (a filtrate contains a dispersion of the support material or small pieces of the support material)

x: A support material is not collected (the support material is dissolved or dispersed as an emulsion, and therefore filtration is impossible)

-: A support material is not separated from a PMMA plate

Separability of Model Material/Support Material

⊚: Excellent separability (an interface can be clearly observed)

○: Sufficient separability is observed (the vicinity of an interface is not clouded and the interface can be observed)

Δ: Separability is observed insufficiently (the vicinity of an interface is clouded and the interface can be hardly observed)

x: No separability (the whole is clouded and a mixed state is observed)

Molding Accuracy at Boundary of Model Material/Support Material

A cured product was prepared in the same manner as the above removability of a support material. However, just before irradiation with an ultraviolet irradiation apparatus, a tip was caused to reach a PMMA surface by vertical piercing into "LH100white". Thereafter, by horizontally moving the tip to the side of the active energy ray-curable resin composition obtained in each of Example and Comparative Examples as it was, a portion of a model material extending thinly toward a support material was prepared. In this state, irradiation with a ultraviolet ray was performed immediately to obtain a cured product, and the cured product was immersed in deionized water. The support material was removed, and the cured product was then taken out. A state of a boundary between the model material and the support material was evaluated by the following evaluation method.

⊚: Molding accuracy at a boundary is excellent (a thinly extended model material is cured and remains almost as it is)

○: Molding accuracy at a boundary is slightly excellent (about a half length of a thinly extended model material remains)

Δ: Molding accuracy at a boundary is slightly poor (only a root portion having a cross-sectional area of about 1 mm of a thinly extended model material is cured and remains)

x: Molding accuracy is poor (the portion of a thinly extended model material disappears, and the extended portion cannot be specified)

TABLE 2

| | | photocurable ink | | support material | | |
|---|---|---|---|---|---|---|
| | E | viscosity (mPa·s) | inkjet discharge property support material | B | curability (the number of passes) | bleeding out resistance |
| Example 1 | E-1 | 22 | ○ | B-1 | 1 | ⊚ |
| Example 2 | E-2 | 12 | ⊚ | B-2 | 1 | ⊚ |
| Example 3 | E-3 | 30 | ○ | B-3 | 3 | ⊚ |
| Example 4 | E-4 | 14 | ⊚ | B-4 | 3 | ○ |
| Example 5 | E-5 | 45 | ○ | B-5 | 1 | ○ |
| Comparative Example 1 | E-6 | 13 | ⊚ | B-6 | 10 | ○ |
| Comparative Example 2 | E-7 | 73 | ○ | B-7 | 10 | ○ |
| Comparative Example 3 | E-8 | 220 | Δ | B-8 | 3 | X |

In a 10 ml graduated cylinder, 3 g of the active energy ray-curable resin composition obtained in each of Examples and Comparative Examples was put. Thereonto, 3 g of "LH100white" was introduced quietly so as not to be mixed with a support material. The graduated cylinder the whole of which was covered with an aluminum foil such that no light entered the graduated cylinder was allowed to stand for 24 hours. Thereafter, an interface state between LH100white and the active energy ray-curable resin composition for a support material were observed. Separability between a model material and a support material was evaluated by the following evaluation method.

As the results in Table 2 indicate, each of the obtained photocurable inks (E-1) to (E-5) had a viscosity of 50 mPa·s or less at 25° C. As described above, these curable inks have excellent inkjet discharge suitability. In addition, these curable inks contain N-(2-hydroxyethyl) acrylamide, and therefore can be cured even in the air even at an accumulated light amount of 600 mJ/cm² or less. Thus, excellent curability was exhibited. Bleeding out of the support materials (B-1) to (B-5) obtained by curing was also suitably suppressed. On the other hand, the photocurable ink had a low viscosity in each of Comparative Example 1 and Comparative Example 2 of the present invention corresponding to Example 9 described in Patent Literature 8 (JP 2010-155889 A), and therefore had excellent inkjet discharge suitability. However, the accumulated light amount of 2000 mJ/cm² or more was necessary. Thus, curability was low. Excellent curability was exhibited in Comparative Example 3 of the present invention corresponding to Example 2-2 described in Patent Literature 9 (JP 2012-111226 A). However, the viscosity of the photocurable ink was high, and therefore it was found that the photocurable ink used in Comparative Example 3 was not suitable for inkjet discharge. In Comparative Example 3, a polyfunctional monomer was not used. As a result, a sufficient crosslinking structure could not be formed, and therefore a large amount of bleeding out of polypropylene glycol was observed.

completely in a fine portion. Therefore, the support material in Comparative Example 5 was not suitable for use as a support material. In Comparative Example 6 of the present invention corresponding to Example 2-2 described in Patent Literature 9 (JP 2012-111226 A), evaluation of a relationship between a model material and a support material was excellent. Therefore, the support material was completely dissolved in deionized water in one hour. In this way, removal of the support material was possible. However, a yellow oily residue was observed on a PMMA plate and a surface of a model material. Therefore, it was necessary to

TABLE 3

| | model material | | support material | | | support material removability | | support | model material/support material relationship evaluation | |
|---|---|---|---|---|---|---|---|---|---|---|
| | A | dissolution ratio (%) | swelling ratio (%) | B | swelling ratio (%) | washing liquid C | peeling state | time (h) | material collectability | separability | molding accuracy |
| Example 6 | A-1 | <0.1 | 0.1 | B-1 | 110 | water | ◎ | 5 | ○ | ○ | ○ |
| Example 7 | A-1 | <0.1 | 0.1 | B-2 | 150 | water | ◎ | 3 | ○ | ○ | ○ |
| Example 8 | A-1 | <0.1 | 0.1 | B-3 | 250 | water | ◎ | 2 | ○ | ◎ | ◎ |
| Example 9 | A-1 | <0.1 | 0.1 | B-4 | 200 | water | ◎ | 1 | ○ | ○ | Δ |
| Example 10 | A-1 | <0.1 | 0.1 | B-5 | 300 | water | ◎ | 1 | ○ | ○ | ○ |
| Example 11 | A-2 | <0.1 | 0.2 | B-1 | 20 | IPA | ○ | 24 | ○ | ○ | ○ |
| Comparative Example 4 | A-1 | <0.1 | 0.1 | B-6 | 5 | water | X | 168 | — | Δ | ○ |
| Comparative Example 5 | A-1 | <0.1 | 0.1 | B-7 | 5 | water | ΔX | 168 | ○ | X | X |
| Comparative Example 6 | A-1 | <0.1 | 0.1 | B-8 | dissolved | water | Δ | 1 | X | Δ | ○ |
| Comparative Example 7 | A-2 | <0.1 | 0.2 | B-6 | 0 | IPA | X | 168 | — | Δ | ○ |
| Comparative Example 8 | A-2 | <0.1 | 0.2 | B-7 | 0 | IPA | X | 168 | — | X | X |
| Comparative Example 9 | A-2 | <0.1 | 0.2 | B-8 | 0 | IPA | ΔX | 168 | X | Δ | ○ |

Water: ion water
IPA: isopropanol

As the results in Table 3 indicate, each of the support materials (B-1) to (B-5) obtained in Examples 6 to 11 exhibited a high swelling ratio in a washing liquid such as deionized water or isopropanol. In addition, the time required for natural peeling was within 24 hours, and the peeling state was excellent. Regarding a relationship between a model material and a support material, excellent separability and molding accuracy were also exhibited. Thus, these support materials had excellent characteristics as support materials. As shown in Example 12, when isopropanol was used as a washing liquid, the swellability was as low as 10% as compared with washing with deionized water. As a result, the time required for removal was longer. However, both peelability and washability were excellent. On the other hand, in Comparative Example 4, an excellent result was obtained regarding evaluation of a relationship between a model material and a support material. However, the swelling ratio in deionized water was as low as 5%. Therefore, even after immersion for one week (168 hours), the support material was not peeled from the PMMA plate and the model material. Thus, the support material in Comparative Example 4 was not suitable for use as a support material. In Comparative Example 5 of the present invention corresponding to Example 9 described in Patent Literature 8 (JP 2010-155889 A), evaluation of a relationship between a model material and a support material was poor. In addition, the swellability was as low as 5%. As a result, the support material was fragile, and therefore could not be removed wipe off the residue with an organic solvent such as alcohol. After removal of the support material, the washing liquid in Comparative Example 6 became clouded. In this way, it was impossible to collect the support material. In Comparative Examples 7 to 9, neither swelling nor dissolution of a support material was observed. Therefore, the support material could not be removed.

INDUSTRIAL APPLICABILITY

As described above, when the model material (A) and the support material (B) in the present invention are immersed in the washing liquid (C), the swelling ratio of the support material (B) is 10% or more, and the swelling ratio of the model material is 1% or less. Therefore, an internal stress due to a difference in expansion and shrinkage occurs between the support material and the model material. This makes it possible to peel the support material from an interface with the model material. In the manufacturing method of the present invention, it is possible to peel the support material easily and completely without applying an external force. Therefore, it is possible to manufacture a highly accurate three-dimensional molded product including a fine structure. Furthermore, the support material after removal and the washing liquid are separated into two phases. Therefore, a surface of a molded product is not contaminated. As a result, a step of washing fat and oil and the like and a finishing step of wiping fat and oil and the like are unnecessary. Therefore, the method of the present invention is used as a washing method which exerts excellent washing performance. At the same time, it is easy to separate and collect a peeled support material by decantation or filtration. Thus, an effect of reducing an environmental load can be also expected.

The invention claimed is:

1. A method for manufacturing a three-dimensional molded product, comprising:
   obtaining a three-dimensional molded product in inkjet type three-dimensional molding by immersing a roughly molded product formed from a model material (A),
   forming a molded product and a support material (B),
   supporting the shape of the model material (A) during molding in a washing liquid (C) which is water or isopropanol, and
   peeling the support material (B) which has swelled from an interface with the model material (A),
   wherein the swelling ratio of the support material (B) is 10% or more, and the swelling ratio of the model material (A) is 1% or less when the roughly molded product is immersed in the washing liquid (C).

2. The method for manufacturing a three-dimensional molded product according to claim 1, wherein the washing liquid (C) is water.

3. The method for manufacturing a three-dimensional molded product according to claim 1, wherein a photocurable ink (D) used for the model material (A) and a photocurable ink (E) used for the support material (B) are discharged as ink droplets, are laminated, and then are cured by irradiation with an active energy ray to form a three-dimensional molded product.

4. The method according to claim 1, wherein the support material (B) is formed from a photocurable ink (E), which comprises:
   0.5 to 5.0% by mass of a urethane acrylamide (b1) having a polyethylene glycol skeleton;
   2.0 to 50.0% by mass of N-(2-hydroxyethyl) acrylamide (b2);
   2.0 to 30.0% by mass of a cationic monomer (b3) represented by general formula (1);
   40.0 to 70.0% by mass of a compound (b4) having an alkylene glycol structure; and
   0.1 to 5.0% by mass of a photopolymerization initiator (b5)

$$CH_2\!=\!CH\!-\!CO\!-\!Y\!-\!Z\!-\!N^+(CH_3)_3 X^- \qquad \text{General formula (1)}$$

wherein Y represents an oxygen atom or NH, Z represents an ethylene group or a propylene group, X– represents methylsulfonate or p-toluenesulfonate.

5. The method according to claim 4 comprising curing the photocurable ink (E) by irradiation with an active energy ray.

* * * * *